E. J. RYAN.
SAFETY TIRE VALVE.
APPLICATION FILED DEC. 22, 1914.
1,187,654.
Patented June 20, 1916.
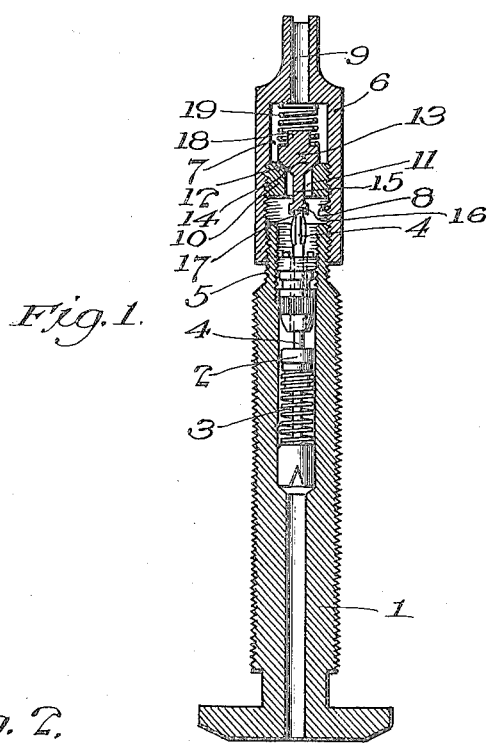
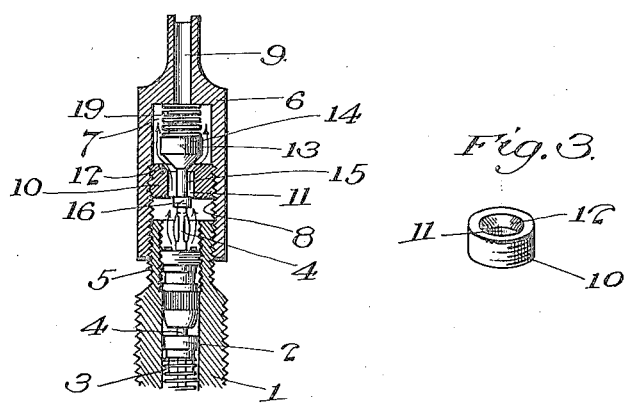
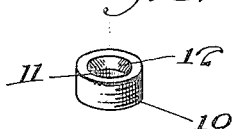
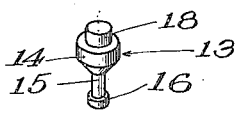
Witnesses:
Inventor:
Elmer J. Ryan
By Frederick Ryan
Attorneys

UNITED STATES PATENT OFFICE.

ELMER J. RYAN, OF LONG BEACH, CALIFORNIA, ASSIGNOR OF ONE-HALF TO PRUDENCE M. WELSH AND ONE-TWENTIETH TO MARVIN H. DARBY, BOTH OF LONG BEACH, CALIFORNIA.

SAFETY TIRE-VALVE.

1,187,654.  Specification of Letters Patent.  Patented June 20, 1916.

Application filed December 22, 1914. Serial No. 878,481.

*To all whom it may concern:*

Be it known that I, ELMER J. RYAN, a citizen of the United States, residing at Long Beach, in the county of Los Angeles and State of California, have invented a new and useful Safety Tire-Valve, of which the following is a specification.

This invention relates to a safety tire valve, and more particularly to an auxiliary valve to be attached to the ordinary tire valve.

One of the objects of this invention is to provide a device which will operate to release a certain amount of air whenever the air pressure within a tire increases beyond a certain predetermined degree, and in so doing serving to prevent blow-outs. The temperature of the air in tires is often increased because of the effect of the sun, heated pavements, etc., and this increase in temperature causes an increase in pressure which often causes a blow-out and my invention aims to provide a device which will never permit the pressure to go over a predetermined degree.

Another object is to provide a very simple and practical auxiliary valve for this purpose which may be attached to the universal tire valve casing without any modifications thereof.

With these and other objects in view, the invention consists of certain novel features of construction, combination and arrangement of parts as will be hereinafter fully described, illustrated and claimed.

Figure 1 is a longitudinal sectional view through my safety valve, showing the same attached to a tire valve. Fig. 2 is a longitudinal sectional view, showing the auxiliary safety valve open to permit an escape of air from a tire. Fig. 3 is a detail perspective view of the valve seat of the safety valve. Fig. 4 is a perspective view of the valve casing member or valve proper.

Referring in detail to the drawings by numerals, 1 designates an ordinary tire valve casing, the passage through which is controlled by a valve 2, which is opened against the action of the spring 3 by an inward movement of the stem 4. In place of the cap which is usually screwed onto the threaded reduced end portion 5 of the tire valve casing 1, after a tire has been inflated, I employ a safety device comprising a hollow cylindrical casing 6 having an interior chamber 7 which is threaded adjacent its outer end, as indicated at 8, and which is in communication at its inner end with a bore or passage 9 opening upon the upper end of the casing. A seat 10 is threaded into the chamber 7 and is formed with a central opening 11, the inner end of which is flared outwardly to form a valve seat 12. The valve 13 is preferably cylindrical, having a body portion 14, which is conically shaped adjacent one end to conform with the seat 12. A stem 15 projects longitudinally from the conically shaped end of the valve through the port 11 of the valve seat, and is slightly enlarged on its free terminal as indicated at 16, and this enlargement is provided with an end opening recess 17 to receive the projecting end of the tire valve stem 4. A lug or boss 18 is formed on the upper end of the valve 13, and is encircled by an expansive helical spring 19, which bears at one end against the valve and at its other end against the upper end of the chamber 7.

In assembling the auxiliary safety device the seat is first placed in the chamber 7, then the valve is positioned and finally the seat is screwed into place, and the pressure at which the valve will open may be regulated by adjusting the position of the seat. The farther in the seat is screwed, the tighter the spring 19 is compressed, therefore the greater the pressure which will be required to unseat the valve.

After a tire has been inflated the proper amount, my auxiliary safety device is screwed onto the end of the tire valve casing 1, so the enlarged end of the stem 15 will engage the end of the tire valve stem 4 and force the same inwardly to unseat the tire valve 2. The spring 19 is somewhat stronger than the spring 3, and therefore the valve 14 will not necessarily unseat when the valve 2 is unseated in the manner just described. Now should the pressure within the tire increase beyond a certain predetermined amount, the valve 14 will unseat and allow enough of the air to escape to again reduce the tire pressure to normal. By adjusting the seat 10 so as to bring it nearer to the inner end of the casing 6 the valve 13 is allowed to move correspondingly and this brings the stem 15 on the valve 13 nearer to the inner end of the casing 6 also and causes the tire valve 2 to be moved nearly into closed position. By this arrangement the valve 2 may be held only slightly open and this prevents the escapement of large quantities of air when the tires encounter bumps in the road beds and at the some time permits sufficient escapement of air to prevent "blowouts".

From the foregoing description taken in connection with the accompanying drawings, it will be apparent that I have provided a very simple and practical auxiliary safety valve, which will prevent tire blow-outs and which may be adjusted to operate when the desired pressure is exceeded.

What I claim is:

1. The combination with a tire valve, of a safety device comprising a casing having internal screw threads and a passage through the outer end communicating with the atmosphere, a longitudinally adjustable valve seat mounted within the casing and having an opening formed therethrough, a valve mounted upon said seat, spring means for normally holding said valve in closed position, and a stem carried by the valve, projecting through the opening in the seat and engaging the stem of the tire valve whereby the tire valve is held open.

2. The combination with a tire valve including a stem and a casing, of a safety device comprising an internally screw-threaded casing having a passage formed through its outer end and communicating with the atmosphere, said casing being connected with the valve casing, a screw-threaded seat member mounted within the casing and being adjustable longitudinally thereof, a valve mounted upon said seat, spring means for normally holding said valve against the seat, and a stem carried by the valve, projecting through the seat and engaging the stem of the tire valve whereby said tire valve is held open.

In testimony whereof, I have hereunto set my hand at Los Angeles, California this 11th day of December, 1914.

ELMER J. RYAN.

In presence of—
RODNEY M. SMITH,
M. H. DARBY.